(12) United States Patent
Lyman

(10) Patent No.: US 10,402,049 B1
(45) Date of Patent: Sep. 3, 2019

(54) USER INTERFACE DEVELOPMENT

(71) Applicant: EMC Corporation, Hopkinton, MA (US)

(72) Inventor: Richard B. Lyman, Pleasant Grove, UT (US)

(73) Assignee: EMC IP Holding Company LLC, Hopkinton, MA (US)

(*) Notice: Subject to any disclaimer, the term of this patent is extended or adjusted under 35 U.S.C. 154(b) by 126 days.

(21) Appl. No.: 14/982,953

(22) Filed: Dec. 29, 2015

(51) Int. Cl.
*G06F 17/22* (2006.01)
*G06F 3/0482* (2013.01)
*G06F 3/0484* (2013.01)
*G06F 8/38* (2018.01)

(52) U.S. Cl.
CPC ........ *G06F 3/0482* (2013.01); *G06F 3/04842* (2013.01); *G06F 8/38* (2013.01); *G06F 17/2235* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,871,232 B2* | 3/2005 | Curie | ..................... | G06Q 10/06 709/225 |
| 7,543,005 B1* | 6/2009 | Edelman | ............... | G06F 16/958 |
| 8,286,154 B2* | 10/2012 | Kaakani | ............. | G05B 19/0426 717/166 |
| 8,356,277 B1* | 1/2013 | Bank | .................... | G06F 9/45529 717/111 |
| 8,566,704 B1* | 10/2013 | Le Bescond De Coatpont | .......... | G06F 17/2247 434/345 |
| 9,229,702 B1* | 1/2016 | Kapulkin | .................. | G06F 8/65 |
| 9,262,142 B2* | 2/2016 | Brauneis | .................. | G06F 8/60 |
| 2003/0138765 A1* | 7/2003 | Bowers | ............... | G06F 11/3684 434/322 |
| 2004/0216084 A1* | 10/2004 | Brown | ............... | G06Q 10/0633 717/102 |
| 2007/0240134 A1* | 10/2007 | Buragohain | ........ | G06F 9/44526 717/140 |
| 2008/0172608 A1* | 7/2008 | Patrawala | ........... | G06F 17/3089 715/255 |
| 2009/0217245 A1* | 8/2009 | Iyer | ..................... | G06F 9/44589 717/126 |
| 2013/0019189 A1* | 1/2013 | Stewart | ............... | G06F 17/3089 715/760 |
| 2014/0282471 A1* | 9/2014 | Chaney | ..................... | G06F 8/65 717/170 |
| 2015/0244585 A1* | 8/2015 | Birk | ........................ | H04L 67/10 726/23 |
| 2016/0154630 A1* | 6/2016 | Zang | ........................ | G06F 8/34 717/109 |

(Continued)

*Primary Examiner* — Hien L Duong
(74) *Attorney, Agent, or Firm* — Workman Nydegger

(57) ABSTRACT

Systems and methods for developing user interfaces. User interfaces are previewed by including plugins in a preview user interface. A preview user interface includes a preview of a plugin in the context of a live user interface. The preview user interface is generated from preview web assets that are a copy of of the web assets used for the live user interface except for the plugin. The plugin is written to the preview web assets and the preview user interface can then be previewed as if the plugin were part of the live user interface. Once the plugin is approved, the plugin can be incorporated into the live user interface.

20 Claims, 4 Drawing Sheets

(56) References Cited

U.S. PATENT DOCUMENTS

2016/0253171 A1* 9/2016 Zang ...................... H04L 67/02
717/101
2016/0292066 A1* 10/2016 Stevens ............... G06F 11/3624

* cited by examiner

USER INTERFACE DEVELOPMENT

FIELD OF THE INVENTION

Embodiments of the invention relate to systems and methods for developing software application. More particularly, embodiments of the invention relate to systems and methods for developing and approving the user interfaces of software applications.

BACKGROUND

Software applications provide a tremendous benefit in today's society. Software applications enable, to name a few, word processing, online shopping, cloud storage, contact management, bookkeeping, and databases. Software applications are widely available and can be used in conjunction with different types of devices such as computers, tablets, and smart phones.

One key aspect of many software applications is the user interface. Most, if not all users, interact with software applications through a user interface that is visually rendered on a display. Users are able to input data, perform searches, make purchases, etc., through the user interface.

Although a user interface may seem simplistic to an end-user, it is often the result of significant work and can be very complicated. For many software applications, many different development teams may contribute to the same user interface. Because work is being done by multiple development teams, there is a need to coordinate and approve changes made to software application. Conventionally, this can be a lengthy process. In fact, this is one of the reasons that conventional updates occur infrequently. The need to ensure that all of the components and modules of software application work together properly takes time.

For example, before a component developed by one of the development teams goes live, it must typically be approved and tested. If only one development team was submitting a change, this could be a simple process. The process becomes more complicated when there are changes or updates submitted by multiple teams. Even when a single person is responsible for approving all changes to the user interface, the approval process can become a bottleneck to software development. Systems and methods are needed to facilitate the development of software applications including the user interface and to simplify the approval process.

BRIEF DESCRIPTION OF THE DRAWINGS

In order to describe the manner in which at least some aspects of this disclosure can be obtained, a more particular description will be rendered by reference to specific embodiments thereof which are illustrated in the appended drawings. Understanding that these drawings depict only example embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Figure 1:
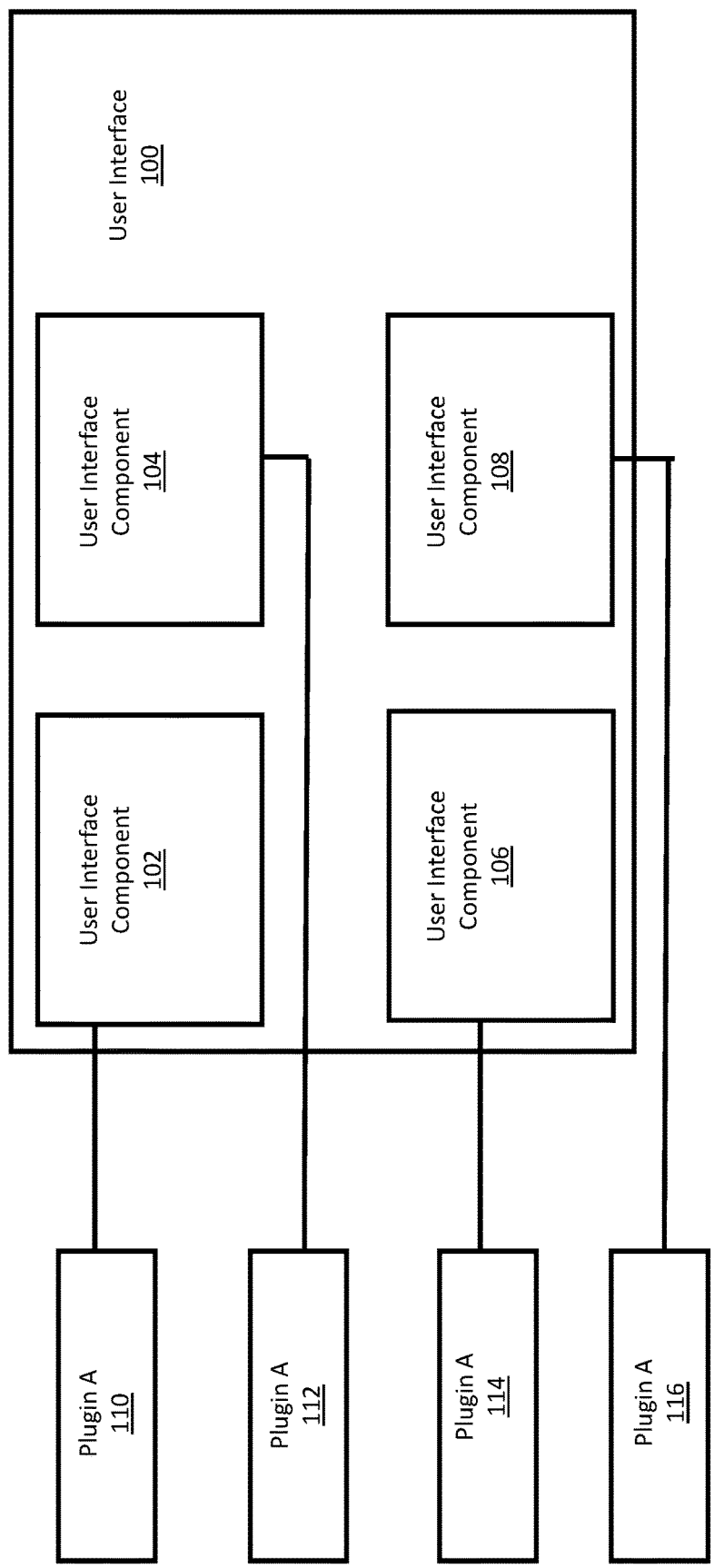
FIG. 1 illustrates an example of a fragmented user interface.

Embodiments of the invention relate to systems and methods for developing a user interface. Embodiments of the invention further relate to systems and methods for approving a user interface and to approving changes to a user interface.

A user interface is usually rendered visually on a display device. The user interface can include a large number of different features and characteristics. The information presented on a user interface may also relate to other software executing on a computing device. For example, a backup operation can be launched from a user interface. Further, the data to be backed up can also be selected from the same user interface. A user interface can be local and/or remote from the associated code. In one example, a user interface may be rendered inside of a browser window.

A user interface can include input controls (e.g., checkboxes, radio and other buttons, toggles, fields, menus, links, or the like), navigational components (e.g., sliders, search fields, page controls, icons, or the like), informational components (e.g., tips, icons, progress bars, notifications messages, and the like), containers (e.g., accordions), or the like. A user interface can be used to receive and/or display data. A user interface, as used herein, is not limited to a single page or display but can include multiple displays, multiple pages (e.g., multiple webpages), or the like or combination thereof.

When a user interface is developed, multiple developers or development teams may each contribute to portions of the user interface. Some development teams may be responsible for specific portions of the user interface. Embodiments of the invention fragment the user interface into pieces or components. The components can be simple in nature or complex. In addition, some components may overlap. For example, one team may be responsible for a login page. Another team may be responsible for identifying and displaying the products purchased by an end user. Another team may be responsible for displaying data sets that have been backed up and allow the end user to interact with the backed up data sets.

Embodiments of the invention can shorten the development process of the user interface by generating a preview user interface of an entire application in a prepared environment. The preview user interface can be adapted such that any development team can view their work or change in the context of a live user interface. In other words, embodiments of the invention provide a user interface preview process that allows each development team to view how their component interacts with the live version of the user interface without adversely affecting the live user interface. Further, the potential changes proposed by other teams can also be previewed in the preview user interface.

Thus, by providing a preview user interface and by providing environments in which the preview user interface can be viewed, multiple teams can view the effect of their work independently of each other. In some examples, each development team can also see the effect of the work of other development teams.

Embodiments of the invention also facilitate the process for approving changes or updates to the user interface. A preview environment allows an approving entity (or entities) to view some or all of the changes that have been submitted for approval in any combination. This allows changes to be approved and integrated into the live user interface more quickly and more efficiently. In addition, the approval process becomes less of a bottleneck to both application development and to application updates.

The preview environment effectively creates a copy of web assets of the live user interface using symlinks and the preview user interface is generated from the copy (referred to herein as preview web assets). Changes to be previewed are written to the preview web assets. This effectively removes the symlink and allows the preview user interface to include the change.

FIG. 1 illustrates an example of a user interface that includes user interface components. This is an example of a fragmented user interface. FIG. 1 illustrates a user interface 100 that includes components 102, 104, 106, and 108. As previously stated, the user interface 100 may include many different pages or displays. For convenience, a single page is illustrated.

The components are each associated with a plugin. As used herein, a plugin, once approved, becomes part of the live user interface. The plugin, when processed or executed, generates at least a portion of the user interface. The user interface (UI) component 102 is associated with plugin A 110, the UI component 104 is associated with plugin B 112, the UI component 106 is associated with the plugin C 114, and the UI component 108 is associated with the plugin D 116.

During development of the user interface 100, a development team A may develop the plugin A 110, a development team B may develop the plugin B 112, a development team C may develop the plugin C 114, and a development team may develop the plugin D 116.

Each plugin corresponds to code that performs a function or purpose in the user interface 100. The plugins 110, 112, 114, and 116 (along with other code used to render the full user interface 100) are an example of web assets. Other web assets include graphics, videos, or the like.

The user interface 100, as a whole, is generated from web assets. The web assets may be stored in a directory structure and are used to construct the user interface 100.

Figure 2:
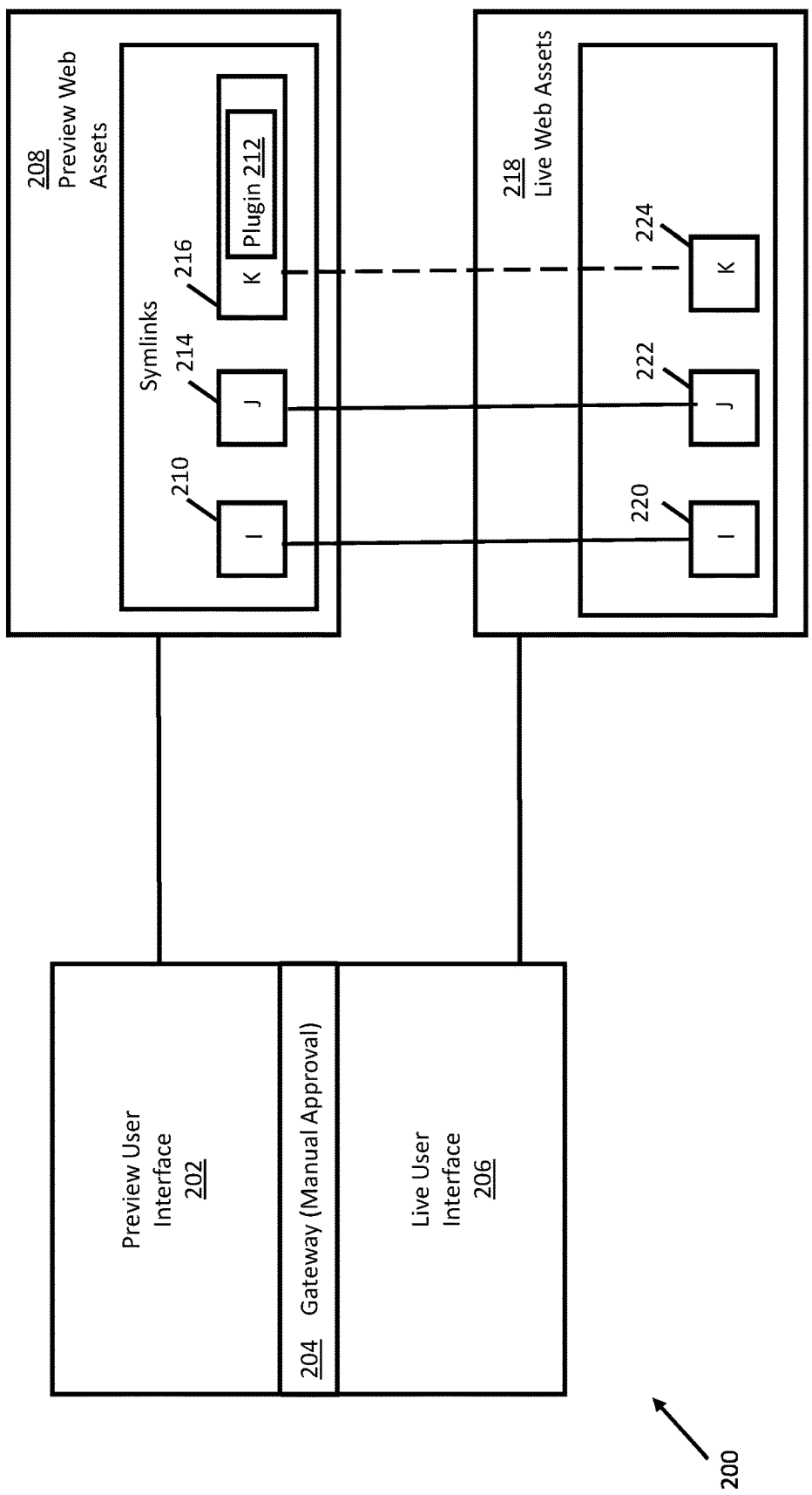
FIG. 2 illustrates an example of an environment for viewing a preview user interface and/or a live user interface.

FIG. 2 illustrates an example of an environment for previewing a user interface. FIG. 2 illustrates an environment 200. In one example, different versions of the user interface 100 may be rendered in the environment 200. The environment 200 includes a preview unit interface 202 and may include a liver user interface 206. The preview user interface 202 is rendered or generated from preview web assets 208 and the live user interface is rendered or generated from live web assets 218. The preview web assets 208 is a copy (using symlinks in one example) of the live web assets 218 and may include a similar directory structure.

More specifically, the web assets may include a directory including directories I 220, J 222 and K 224. When the preview user interface 202 is being prepared, the preview web assets 208 are prepared by copying the live web assets 218. In one example, this includes generating symlinks 208. Thus, the preview web assets 208 may not be an exact copy of the live web assets 218, but includes a similar directory structure that includes links to the files and data in the directory structure of the live web assets 218.

The symlinks 208 include a symlink K 216 to the directory K 224, a symlink 214 J to the directory J 222, and a symlink I 210 to the directory I 220. Without any change to the symlinks 208, the preview user interface 202 generated from the preview web assets 208 would be the same as the live user interface 206 generated from the live web assets 218. Embodiments of the invention allow changes to be viewed in the context of the live user interface in part because the live web assets 218 are being used to generate most of the preview user interface 202.

The preview user interface 202 can be used by any development team. Multiple environments 200 can be generated. For example, the development team A, which is responsible for the plugin A 110, may have the environment 200 prepared. When the preview web assets 208 are generated, the symlinks 210, 214 and 216 are generated.

In order to view the change prepared by the development team A, the plugin (or plugins) are extracted into the preview web assets 208. In effect the plugin overwrites some of the symlinks in the preview web assets 208. Thus, when the preview user interface 202 is generated, the preview user interface 202 reflects the plugin being previewed in the context of the live user interface.

In this example, the plugin may correspond to the directory K 224. Thus, the preview web assets 208 are modified by copying the plugin 110 into the file 212. In this example, the preview web assets 208 include symlinks to the live web assets 218 except for the file 212. In one example, the preview web assets 208 is a set of temporary directories. The plugins are extracted into the temporary directories so that they can be viewed in the preview user interface 202. The plugin can be viewed in the preview user interface 202 without any approval. This allows the development team to evaluate the effect of their plugin on the user interface before submitting the plugin for approval.

More specifically, the file plugin 212 is written over the symlinks 216 K and is an example of the change that the development team A would like to preview in the preview user interface. When the user interface is loaded using the preview web assets 208 (which include the new plugin 212), the preview user interface 202 corresponds to the live user interface 206 except for the portion of the user interface corresponding to the plugin 212.

With a fragmented user interface, individual development teams are able to preview their new or updated plugin in the context of the existing live user interface 206.

After the development team A is satisfied with the plugin 212, the plugin 212 can be submitted for approval. Approval is then requested through a gateway 204, which may include a manual approval process. The person or group responsible for approving the plugin 212 can also have an environment such as the environment 200 in which the plugins submitted for approval may be previewed. If the plugin 212 is approved, the plugin 212 can be integrated into the live web assets 218 immediately and become part of the live user interface 206. This allows the development of the user interface to be much more responsive and adaptable. Even if an unsatisfactory change is made to the live user interface 206, it can be changed due to a responsive and quick approval process.

In one example, a cookie can be used to determine whether the preview user interface is displayed or whether the live interface is displayed in a browser. In one example, the cookie may be associated with a particular plugin or set of plugins. The cookie can then be used to ensure that the user interface is generated from the preview web assets into which the plug in has been extracted. For example, the environment 200 may be used by a developer to preview the plugin. A cookie is set in the browser such that the preview user interface is loaded. The developer can reset the cookie in order to have the live user interface displayed without the plugin from the web assets.

Figure 3:
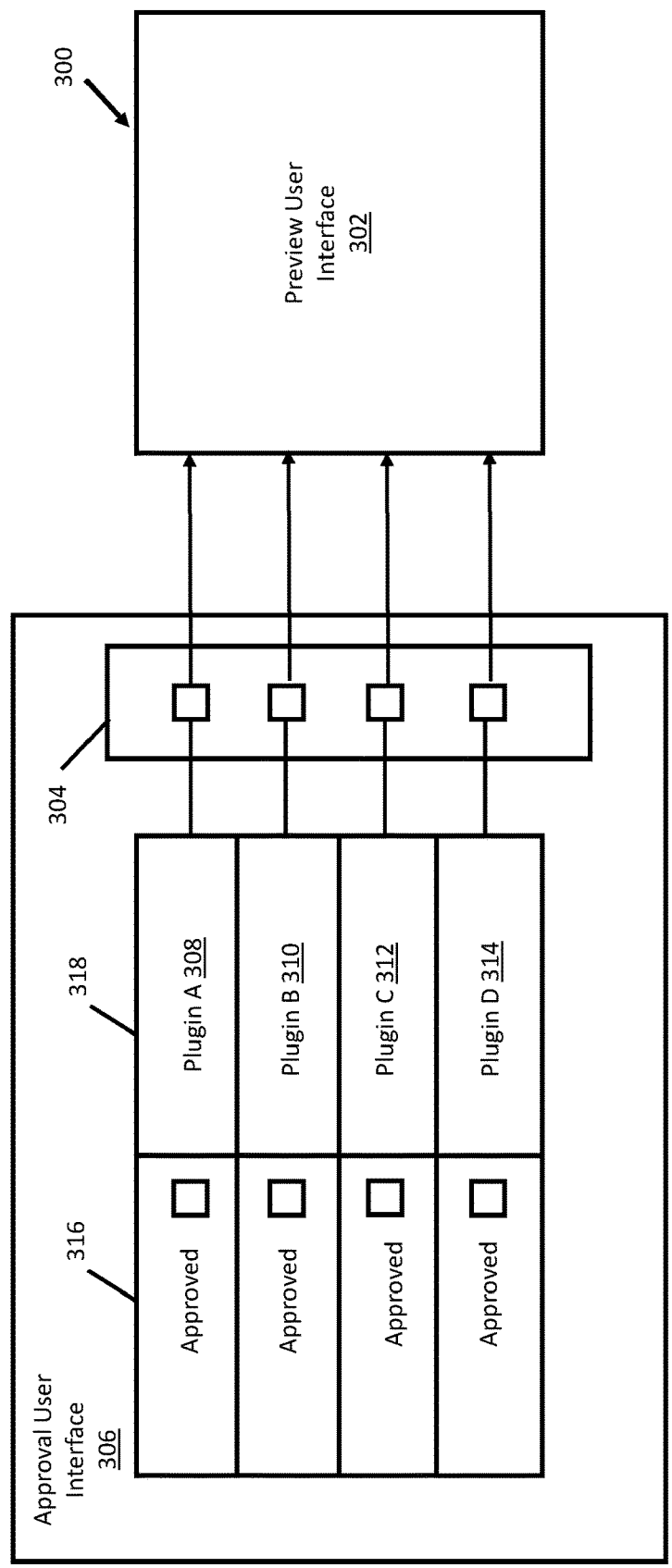
FIG. 3 illustrates an example of an approval process for changes to a user interface.

FIG. 3 illustrates an example of a process for approving a plugin. FIG. 3 is an example of the gateway 204 shown in FIG. 2, which includes input from at least one approver. FIG. 3 illustrates an environment 300 in which a preview user interface 302 may be generated from preview web assets. When a plugin is submitted for approval, an approver may be provided with an approval interface 306. The approval interface 306 may include a list 318 of plugins that have been submitted for approval. This list 318 includes plugins 308, 310, 312, and 314. Each plugin is associated with a corresponding approved checkbox 316.

The approval interface 306 may include a selector 304 that allows the approver to identify which plugins are to be previewed in the preview user interface 302. The selector 304 allows any combination of the plugins 308, 310, 312, and 314 to be selected.

Based on the selections, the preview user interface 302 is then generated as previously discussed using preview web assets. The plugins selected or identified by the selector 304 are written into the preview web assets so that the approver can visually appreciate how the proposed plugins would look and feel in the live user interface if approved.

In one example, the user interface (whether the preview user interface or the live user interface) may be generated by a user interface server. The user interface server uses the web assets to construct the relevant user interface using either the web assets or the preview web assets. As previously stated, both the preview user interface and the live user interface may be rendered in a browser.

Figure 4:
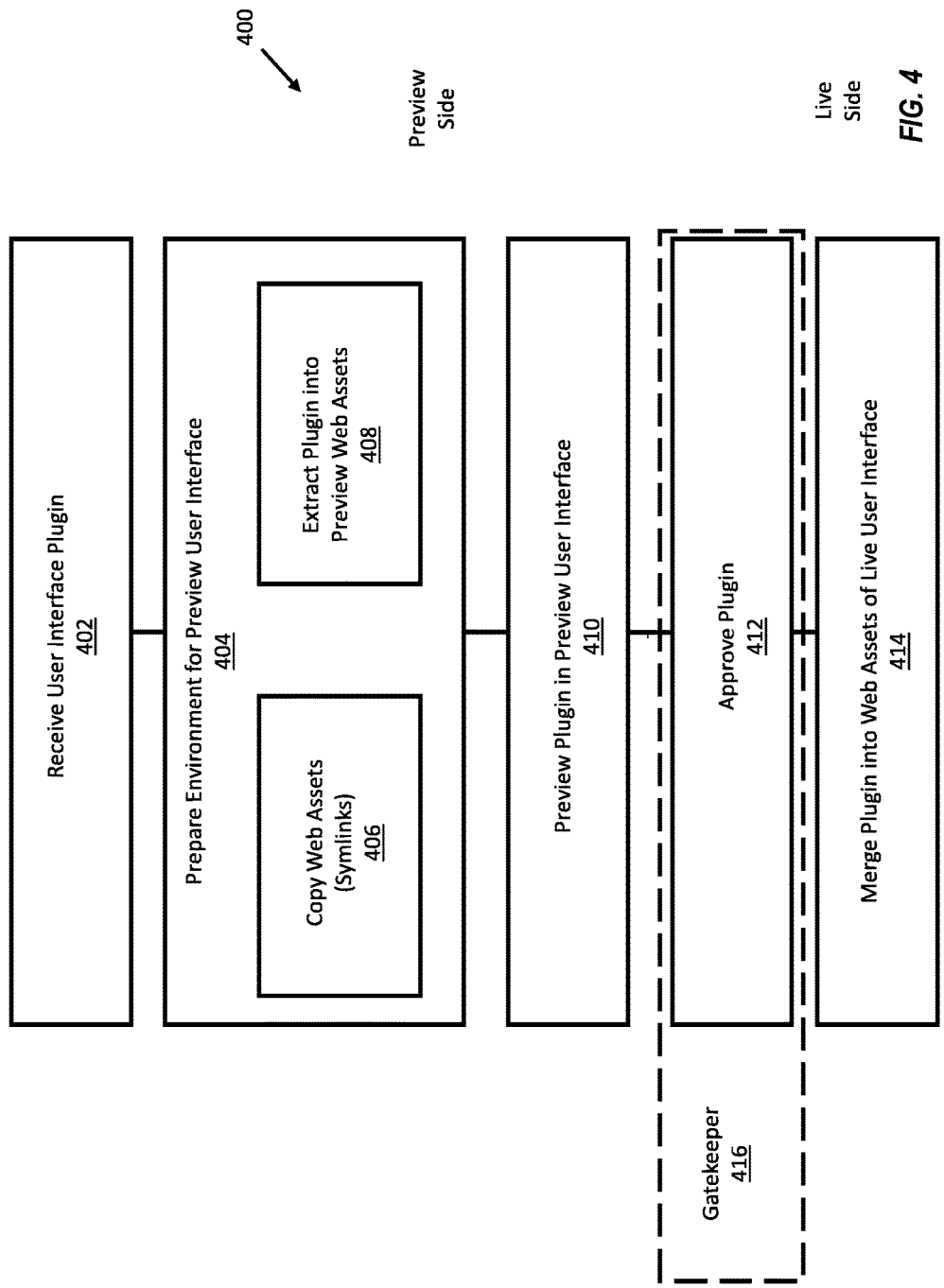
FIG. 4 illustrates an example of a method for developing a user interface.

FIG. 4 illustrates an example method for developing a user interface. In box 402, a plugin for the user interface is prepared or received by a preview environment. In one example, multiple plugins may be received from the same or different development teams. In box 404, preview environment is prepared for previewing the preview user interface including the plugin(s) received from the development team(s).

Preparing the preview environment may include performing a security check on the plugin. For example, the plugin may be checked to make sure it does not contain malware and or to insure it complies with requirements associated with the prepared environment. For example, the plugin may be required to have a particular format and may be required to include certain portions.

Preparing the preview environment may also include performing an automated pre-check on the plugin. Part of the automated pre-check could be checking for integration errors and/or scope conflict. For example, any plugin that includes any code that modifies part of the user interface or application outside the scope of the plugin may be automatically rejected.

Modern libraries provide abilities, like CSS (Cascading Style Sheets) Selectors, that help development teams reference parts of the user interface. If a plugin includes code that changes something (e.g., a source attribute for every image tag in the entire application) then the plugin should probably be revised and may not be ready to be previewed. Part of the automated pre-check may also include a check for integration errors. For example, any plugin that changes a global variable may result in the plugin being rejected or held subject to further confirmation. By performing these types of automated pre-checks and security checks, the development process of the plugin is improved (the development process may be faster for example because the potential errors are identified automatically). When the plugin is previewed in the preview user interface, it is less likely to include these types of errors and is closer to being ready for inclusion in the live user interface.

In box 406, the preview environment is prepared by copying the web assets associated with or used to generate the live user interface. As previously discussed, the copy is an example of preview web assets and includes, by way of example only, symlinks (files that contain a reference to another file or directory) to the web assets.

The plugin is then extracted into the preview web assets in box 408. Extracting the plugin may include the addition of files to the preview web assets and/or the deletion of files from the preview web assets. For example, assume that the preview web assets includes a directory that includes symlinks to three files. The plugin that is written into the same directory may only includes two files that correspond to two of the symlinks. Thus, the two symlinks that correspond to the two files included in the plugin are overwritten or replaced with the files from the plugin. The third symlink is deleted from the preview web assets. If the plugin includes a file or data not referenced in the preview web assets, then the file is simply added to the appropriate directory or other structure in the preview web assets.

Once the plugin is extracted, the preview user interface is generated in box 410 from the preview web assets. In one example, a user interface server may generate the preview user interface from the preview web assets. This ensures that the plugin that was extracted into the preview web assets is shown in the context of the other web assets associated with the live interface. Stated differently, the preview user interface is presented as if the change had been implemented in the live user interface.

If another plugin is to be previewed, this process can be repeated. By making appropriate adjustments to the preview web assets, multiple plugins can be previewed in different combinations. This may include restoring certain symlinks, overwriting other symlinks, or the like. The files written to or deleted from the preview web assets may depend on which plugins are being previewed.

If the preview user interface is deemed satisfactory by the development team, the plugin can be submitted for approval in box 412. In one example, the gateway 416 can be automated by ensuring that the plugin satisfies certain rules. Alternatively, the gatekeeper 416 may include a process that requires manual input from an approver. During the manual process, a preview user interface may be generated for the approver.

In one example, the approver can approve or reject the plugin. The approver may also be able to provide feedback that will allow further development of the plugin to be performed. If approved, the plugin can be merged into the web assets 414 and thus become part of the live user interface.

The systems and methods discussed herein allow multiple teams to work on their plugins at the same time. Thus, team A does not need to wait for team B's plugin to be approved before submitting their plugin for approval. In fact, it may not be known beforehand which plugin will be approved first. Once one of the plugins is approved, the preview user interface presented to the other team will include that plugin in one embodiment.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware such as solid state disk (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, server, or target virtual machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for developing a user interface, the method comprising:
   receiving changes to the user interface to be previewed in a preview user interface;
   preparing an environment for displaying the preview user interface by copying links including first links and second links to web assets associated with a live user interface into preview web assets, wherein the web assets are developed by a plurality of development teams including a first development team and a second development team, wherein the changes are developed by the first development team, wherein the first development team cannot change the web assets developed by the second development team;
   inserting the changes into the preview web assets, wherein inserting the changes includes overwriting a portion of the first links to the web assets with the changes such that the preview web assets includes the changes and the first links links to the web assets that were not overwritten;
   generating the preview user interface of the live user interface in a display by constructing the preview user interface from the preview web assets such that the changes are presented in a context of the live user interface and such that the preview user interface is generated from the changes and the live web assets associated with the first links that were not overwritten.

2. The method of claim 1, further comprising receiving a plurality of changes from each of the plurality of development teams.

3. The method of claim 1, wherein inserting the changes into the preview web assets includes overwriting the portion of the first links with files included in the changes.

4. The method of claim 3, wherein the preview user interface corresponds to the live user interface except for a component corresponding to the changes.

5. The method of claim 1, further comprising:
   performing a security check on the changes before inserting the changes into the preview web assets;
   determining whether the changes includes integration errors prior to inserting the changes into the preview web assets;
   determining whether a scope of the changes conflicts with a scope of any portion of the preview web assets prior to inserting the changes into the web asset.

6. The method of claim 1, wherein inserting the changes into the preview web assets includes at least one of:
   deleting the portion of the first links from the preview web assets,
   adding assets from the changes to the preview web assets, and
   overwriting the portion of the first links in the preview web assets.

7. The method of claim 1, further comprising setting a cookie in a browser such that the preview user interface is generated by a user interface server.

8. A method for approving one or more plugins to include in a live user interface, the method comprising:
   generating an approval user interface that allows an approver to approve changes to the live user interface;

displaying a list of changes in the approval user interface;
displaying a section that allows an approval to be input from the approver in the approval user interface;
selecting at least one of the changes from the list of changes;
extracting the selected changes into preview web assets, wherein the preview web assets includes links including first links and second links to web assets associated with the live user interface, wherein extracting the selected at least one changes includes overwriting a portion of the first links to the web assets with the second links to new assets associated with the selected changes such that the preview web assets includes the selected changes and the first links to the web assets associated with the live user interface that were not overwritten, wherein the web assets are developed by a plurality of development teams including a first development team and a second development team, wherein the selected changes are developed by the first development team and where in the first development team cannot change the web assets developed by the second development team;
generating a preview user interface of the live user interface that includes the selected changes from the preview web assets such that the selected changes are presented in a context of the live user interface and such that the preview user interface is generated from both the selected changes and the web assets associated with the first links that were not overwritten.

9. The method of claim 8, further comprising generating a different preview user interface by selecting different changes from the list of changes.

10. The method of claim 9, further comprising adjusting the preview web assets to include the first links to the web assets that were not overwritten and files from the selected different changes.

11. The method of claim 8, further comprising regenerating the preview user interface each time a different set of changes is selected from the list of changes.

12. The method of claim 8, further comprising approving one or more of the changes in the list of changes.

13. The method of claim 12, further comprising incorporating the approved one or more of the changes into the web assets associated with the live user interface such that the live user interface, when generated, includes the approved one or more of the changes.

14. The method of claim 12, further comprising providing feedback to developers for changes in the list of changes that were not approved, wherein the feedback is received into the approval user interface.

15. A method for developing a user interface, the method comprising:
receiving changes for a user interface;
preparing an environment for displaying the changes in a preview user interface, wherein the preview user interface includes links to web assets;
adding the changes to preview web assets such that the preview web assets are associated with a live user interface and the changes, wherein adding the changes includes overwriting at least some of the links to the live web assets with the changes, wherein the web assets are developed by a plurality of development teams including a first development team and a second development team, wherein the changes are developed by the first development team and where in the first development team cannot change the web assets developed by the second development team;
previewing the changes in the preview user interface which is generated from the preview web assets such that the changes are presented in the context of the live user interface;
submitting the changes for approval; and
merging the changes into the live web assets after the changes are approved.

16. The method of claim 15, wherein submitting the changes for approval includes displaying the preview user interface including the changes to an approver that approves the changes.

17. The method of claim 15, further comprising receiving a plurality of changes from each of the development teams.

18. The method of claim 15, wherein inserting the changes into the preview web assets includes overwriting the links included in the preview web assets with files included in the changes.

19. The method of claim 15, further comprising performing a security check on the changes before inserting the changes into the preview web assets.

20. The method of claim 15, wherein the changes are associated with a component of the live user interface, wherein all links to the web assets associated with the component are overwritten or deleted when the changes are inserted into the preview web assets such that the preview user interface corresponds to the live user interface if the plugin were approved.

* * * * *